United States Patent
Enomoto

(10) Patent No.: US 9,390,534 B2
(45) Date of Patent: Jul. 12, 2016

(54) COMPUTER SYSTEM AND ASSEMBLY ANIMATION GENERATION METHOD

(75) Inventor: Atsuko Enomoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 298 days.

(21) Appl. No.: 14/111,235

(22) PCT Filed: Apr. 13, 2012

(86) PCT No.: PCT/JP2012/060106
§ 371 (c)(1),
(2), (4) Date: Dec. 27, 2013

(87) PCT Pub. No.: WO2012/141282
PCT Pub. Date: Oct. 18, 2012

(65) Prior Publication Data
US 2014/0118358 A1    May 1, 2014

(30) Foreign Application Priority Data
Apr. 13, 2011 (JP) ................................. 2011-089386

(51) Int. Cl.
  G06T 13/00   (2011.01)
  G06T 13/20   (2011.01)
  G06T 19/00   (2011.01)
  G06T 19/20   (2011.01)

(52) U.S. Cl.
  CPC ............... *G06T 13/20* (2013.01); *G06T 19/003* (2013.01); *G06T 19/20* (2013.01); *G06T 2219/2008* (2013.01)

(58) Field of Classification Search
  None
  See application file for complete search history.

(56) References Cited

U.S. PATENT DOCUMENTS

| 6,144,375 | A  | * | 11/2000 | Jain .................... G06F 17/30017 345/420 |
| 6,453,209 | B1 | * | 9/2002  | Hill ........................ B62D 65/00 700/117 |
| 6,766,059 | B1 | * | 7/2004  | Kondo .................. G06T 7/2006 375/240.14 |
| 7,295,958 | B1 | * | 11/2007 | Suh ......................... G06F 17/50 703/2 |
| 7,403,833 | B2 | * | 7/2008  | Heide ..................... G06F 17/50 700/119 |
| 2002/0122038 | A1 | * | 9/2002  | Cowperthwaite ....... G06T 15/40 345/428 |

(Continued)

FOREIGN PATENT DOCUMENTS

| JP | 2006-139500 A | 6/2006 |
| JP | 2008-046924 A | 2/2008 |

(Continued)

*Primary Examiner* — Anh-Tuan V Nguyen
(74) *Attorney, Agent, or Firm* — Volpe and Koenig, P.C.

(57) ABSTRACT

Provided is a technology for automatically generating a camera pose enabling the viewing of an operation of an object component in a work instruction animation. A primary inertia axis of an assembled item is calculated from inertia tensor information of a plurality of components constituting the assembled item. Adjacency relationship information indicating an adjacency relationship between the plurality of components is acquired. Based on the adjacency relationship information of the plurality of components, an assembly sequence and an assembly motion vector indicating an assembled direction of the plurality of components are generated such that each of the plurality of components does not interfere with a proximate component. Further, a plurality of camera eye sights each having a camera axis about the primary inertia axis and providing an operator's vision candidate during the generation of the assembly animation is arranged.

14 Claims, 12 Drawing Sheets

(56) References Cited

U.S. PATENT DOCUMENTS

| | | | | |
|---|---|---|---|---|
| 2002/0123812 | A1* | 9/2002 | Jayaram | G06T 19/20 700/98 |
| 2002/0143507 | A1* | 10/2002 | Lu | G06F 17/5086 703/7 |
| 2005/0237322 | A1* | 10/2005 | Minami | G06T 13/20 345/419 |
| 2008/0228450 | A1* | 9/2008 | Jakobsen | G06T 17/10 703/2 |
| 2008/0312880 | A1* | 12/2008 | McLuckie | G05B 17/02 703/1 |
| 2009/0259443 | A1* | 10/2009 | Fujiki | G06F 17/5009 703/1 |
| 2009/0315885 | A1* | 12/2009 | Baszucki | G06T 13/20 345/420 |
| 2010/0149214 | A1* | 6/2010 | Wiemker | G06T 19/00 345/643 |
| 2011/0118941 | A1* | 5/2011 | Linker | B62J 27/00 701/42 |
| 2011/0128350 | A1* | 6/2011 | Oliver | H04N 5/232 348/36 |
| 2012/0130521 | A1* | 5/2012 | Kohlhoff | G06T 19/00 700/98 |

FOREIGN PATENT DOCUMENTS

| | | |
|---|---|---|
| JP | 2011-013986 A | 1/2011 |
| JP | 2012-014569 A | 1/2012 |

* cited by examiner

COMPUTER SYSTEM AND ASSEMBLY ANIMATION GENERATION METHOD

TECHNICAL FIELD

The present invention relates to a computer system and an assembly animation generation method. For example, the present invention relates to as a technology for generating, by using a computer and based on an assembly sequence indicating the sequence for assembling an assembled item, an assembly animation showing an operation for assembling the assembled item.

BACKGROUND ART

When a completed item is made by assembling a plurality of components, it is very helpful for the assembly work if the assembly operation can be shown by animation. For example, Patent Document 1 discloses a method of generating an assembly animation by calculating an assembly order and associated directions of motion.

PRIOR ART DOCUMENT

Patent Document

Patent Document 1: JP Patent Publication (Kokai) No. 2008-46924 A

SUMMARY OF THE INVENTION

Problem to be Solved by the Invention

However, the conventional animation creation technology according to Patent Document 1 does not take into consideration the camera pose required during animation creation. Thus, even though an assembly operation animation is generated, the camera remains in an initial pose. As a result, the view of the operation of an object component to be shown to the worker may be blocked by other components.

The present invention was made in view of the above circumstances, and provides a technology for automatically generating a camera pose such that the operation of an object component in an animation of work instruction is visible.

Means for Solving the Problem

In order to solve the above problem, according to the present invention, an operator's vision in accordance with an actual work is automatically generated by estimating a horizontal planer face on which the object work is installed and on which the worker (also referred to as an "operator" or a "user") stands.

According to the present invention, inertia tensor information of a plurality of components constituting an assembled item is acquired, and a primary inertia axis of the assembled item is calculated from the inertia tensor information. Adjacency relationship information indicating an adjacency relationship between the plurality of components is acquired. Based on the adjacency relationship information of the plurality of components, an assembly sequence such that each of the plurality of components does not interfere with a proximate component, and an assembly motion vector indicating an assembled direction of the plurality of components are generated. A plurality of camera eye sights each having a camera axis about the primary inertia axis and providing an operator's vision candidate during the generation of the assembly animation is arranged. For each of the plurality of components, the camera eye sight having a direction most closely matching the assembly motion vector of an object component is selected, and the selected camera eye sight is set as an operator's vision for the object component. From the set operator's vision, an assembled item assembly animation is generated.

Other features related to the present invention will become apparent from a reading of the description of the present specification when taken in conjunction with the attached drawings. Modes of the present invention may be attained and implemented by various elements or various combinations of elements, or by modes described in the following detailed description and set forth in the appended claims.

It should be understood that the description of the present specification merely illustrates typical examples, and does not limit in any sense the scope of the claims of the present invention or applications thereof.

EFFECTS OF THE INVENTION

According to the present invention, an operator's vision can be automatically generated by estimating a positional relationship between a work installation posture and the worker during in an assembly work based on an assembly model as the object of assembly, whereby the man-hour for assembly operation instruction can be decreased.

MODE FOR CARRYING OUT THE INVENTION

Figure 1:
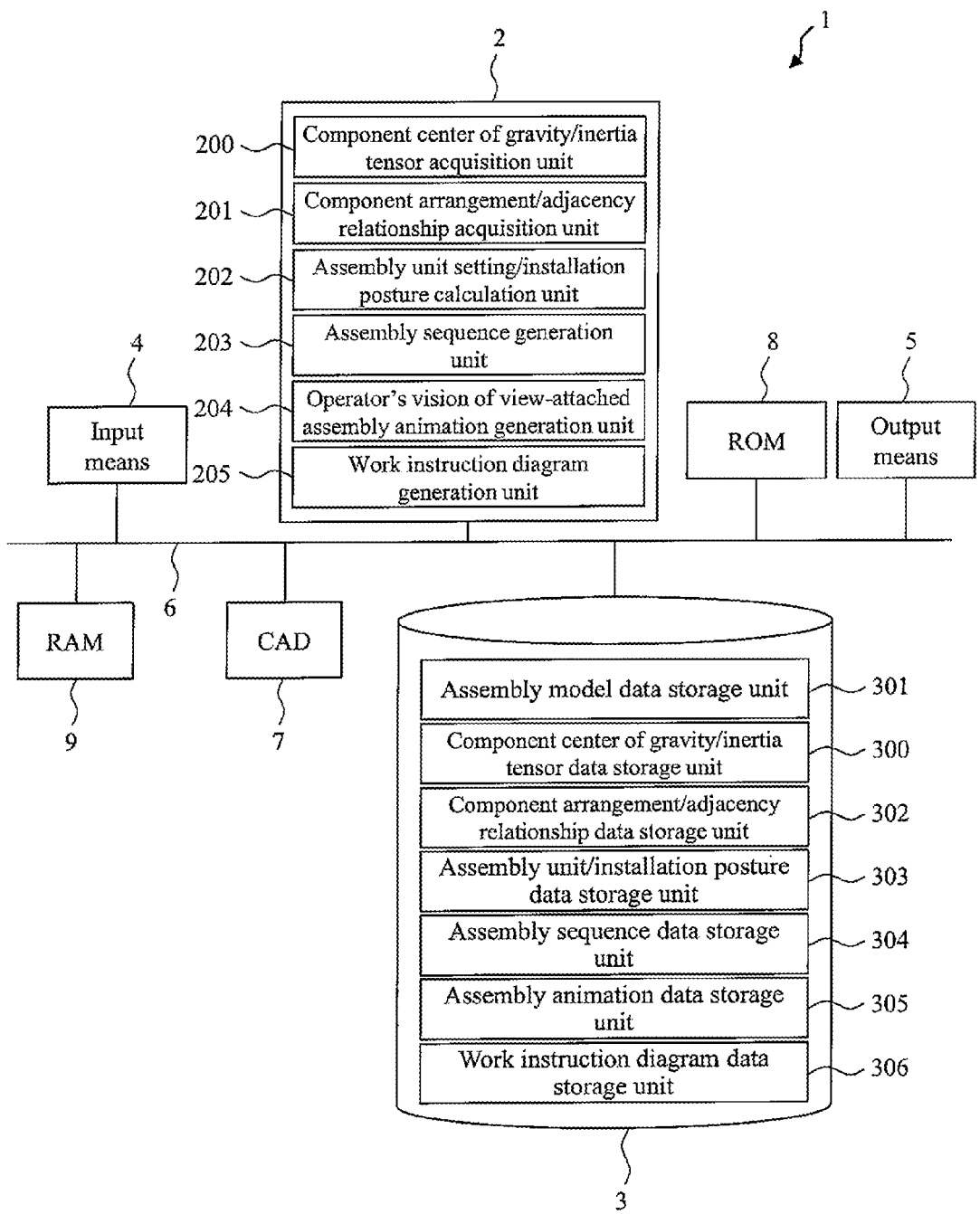
FIG. 1 is a schematic diagram of a computer system according to an embodiment of the present invention.

The present invention provides a technology for automatically generating an operator's vision in accordance with the assembly work for an item actually being assembled by a worker (a field of view conveying the virtual sense of viewing by the worker), and an assembly animation or an assembly work instruction diagram based on the operator's vision.

In the following, an embodiment of the present invention will be described with reference to the attached drawings. In the attached drawings, functionally similar elements may be designated with similar reference numerals. While the attached drawings illustrate specific embodiments and implementation examples in accordance with the principle of the present invention, these are for the benefit of an understanding of the present invention and are not to be used for interpreting the present invention in a limiting sense.

While the present embodiment will be described in sufficient detail enabling a person skilled in the art to carry out the present invention, it should be understood that other implementations or modes are also possible, and that modifications in configuration or structure and substitution of various elements may be made without departing from the technical scope and spirit of the present invention. Thus, the following description shall not be interpreted in a limiting sense.

Further, the embodiment of the present invention may be implemented by software running on a general-purpose computer, or may be implemented by dedicated hardware or a combination of software and hardware, as will be described below. Thus, an acquisition unit, a calculation unit, and a generation unit may be paraphrased as an acquisition program, a calculation program, and a generation program, respectively.

<Configuration of Computer System>

FIG. 1 is a schematic diagram of a computer system (which may also be referred to as an "assembly viewpoint generation system") for realizing the present invention.

The computer system 1 includes a processing means 2 that reads various programs stored in a read only memory (ROM) 8, opens the programs in a random access memory (RAM) 9, and executes processes in accordance with the programs; a storage means 3 for storing acquired data and processing results; an input means 4 for a user to input information or necessary instructions; an output means 5 for outputting a processing result or a created animation; a CAD 7 in which at least CAD data is stored; the ROM 8 in which at least various programs are stored; and the RAM 9 that provides a work area for at least the processing means 2. These units are connected via a connection line 6.

The processing means 2 includes a processor, such as a CPU. The storage means 3 may include an HDD or a semiconductor memory. The input means 4 may include a keyboard and mouse (pointing device). The output means 5 may include a display or a printer. The connection line 6 may include a connection code or a network.

The processing means 2, by reading and executing the programs stored in the ROM 8, for example, functions as a component arrangement/adjacency relationship acquisition unit 201, an assembly unit setting/installation posture calculation unit 202, an assembly sequence generation unit 203, an operator's vision attached assembly animation generation unit 204, and an work instruction diagram generation unit 205.

The component center of gravity/inertia tensor acquisition unit 200 acquires center of gravity information and inertia tensor (inertia main axis: inertia moment axis) information about components designated by the user the (operator) from the CAD 7, and stores the information in a component center of gravity/inertia tensor data storage unit 300 of the storage means 3.

The component arrangement/adjacency relationship acquisition unit 201 acquires information about an arrangement of the components designated by the user and information about an adjacency relationship between the components (such as information indicating that components 1 and 2 are adjacent to each other in an assembled item) from the CAD 7, and stores the information in a component arrangement/adjacency relationship data storage unit 302 of the storage means 3. The information may be designated by the user. In this case, the component arrangement/adjacency relationship acquisition unit 201 stores the information designated and inputted by the user in the component arrangement/adjacency relationship data storage unit 302 of the storage means 3.

The assembly unit setting/installation posture calculation unit 202 sets an assembly unit specified by the user as a sub-assembly or simultaneously assembled components. The assembly unit setting/installation posture calculation unit 202 also calculates a posture in which the components are to be installed for each sub-assembly or simultaneously assembled component based on the component center of gravity/inertia tensor data 300. For example, when a sub-assembly is assembled, a posture different from the posture of the final assembled item may in some cases enable easier assembly. Thus, a stable posture enabling easy assembly of the sub-assembly or the simultaneously assembled components is calculated herein by using the inertia tensor information. The assembly unit setting/installation posture calculation unit 202 displays the calculated component posture data on the screen of the output means 5 (display), and stores the data in the assembly unit/installation posture data storage unit 303 in response to confirmation by the operator. Upon instruction by the operator for correction, the assembly unit setting/posture calculation unit 202 stores the data in the assembly unit/installation posture data storage unit 303 after adding correction in accordance with the instruction for correction.

The assembly sequence generation unit 203 generates a completed item assembly sequence by using the component arrangement/adjacency relationship data and assembly unit data.

The operator's vision-attached assembly animation generation unit 204 generates operator's vision-attached assembly animation data for the completed item based on the assembly sequence generated by the assembly sequence generation unit 203.

The work instruction diagram generation unit 205, based on the operator's vision-attached assembly animation data, creates chronological still images at point locations (which can be designated by the operator) in the animation video in the form of a work instruction diagram. Depending on the operator (worker), only images before and after a predetermined assembly point may be enough, rather than a series of animation images. In order to handle such cases, the work instruction diagram is created. As an example of the work instruction diagram, still images before and after the processing of a certain component (such as assembling) may be mentioned.

The storage means 3 includes an assembly model data storage unit 301 in which assembly model data downloaded from the CAD 7 is stored; the component center of gravity/inertia tensor data storage unit 300 in which the component center of gravity/inertia tensor data for an object component acquired from the CAD 7 is stored; the component arrangement/adjacency relationship data storage unit 302 in which component arrangement and adjacency relationship data for each component acquired from the CAD 7 is stored; the assembly unit/installation posture data storage unit 303 in which an assembly unit for the completed item designated by the operator and calculated installation posture data are stored; an assembly sequence data storage unit 304 in which generated assembly sequence data is stored; an assembly animation data storage unit 305 in which assembly animation data generated based on the assembly sequence data is stored; and an work instruction diagram data storage unit 306 in which the work instruction diagram (which may be referred to as "work instructions") created from the assembly animation is stored.

<Outline of Computer System Process>

Figure 2:
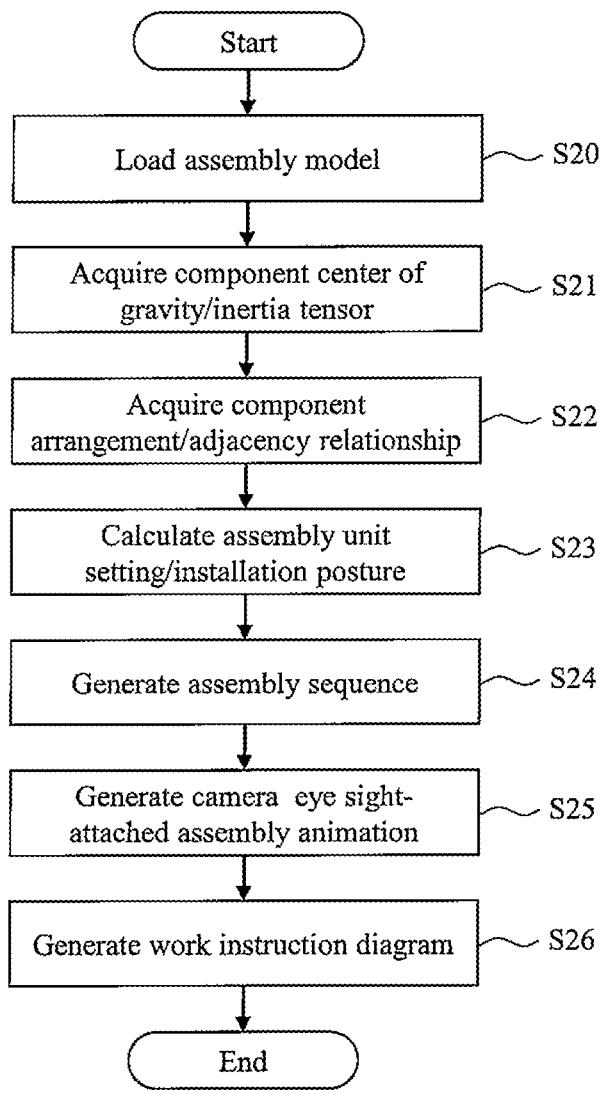
FIG. 2 is a flowchart illustrating the outline of an assembly animation generation process according to the embodiment of the present invention.

FIG. 2 is a flowchart illustrating the outline of processing by the computer system 1.

In step S20, the processing means 2 acquires (downloads) a list of constituent components of the completed item from the CAD 7, and displays the list on the screen of the output means 5. The component list lists up components related to an assembly model for which an assembly sequence and an assembly animation are to be generated. As the operator selects a component as an assembly sequence object on the screen displaying the component list, the processing means 2 registers the data of the selected component as an assembly sequence object in the assembly model data storage unit 301 of the storage means 3.

In step S21, the component center of gravity/inertia tensor acquisition unit 200 acquires, from the assembly model data selected and extracted from the component list by the operator and stored in the assembly model data storage unit 301, the center of gravity data and inertia tensor data for each of the selected components, and stores the data in the component center of gravity/inertia tensor data storage unit 300 of the storage means 3.

In step S22, the component arrangement/adjacency relationship acquisition unit 201 acquires, from the assembly model data extracted from the component list and stored in the assembly model data storage unit 301, the component arrangement/adjacency relationship data by evaluating the arrangement of the components and the adjacency relationship between the components, and stores the data in the component arrangement/adjacency relationship data storage unit 302 of the storage means 3.

In step S23, first, the processing means 2 displays the assembly model data stored in the assembly model data storage unit 301 on the screen of the output means 5. As the operator, using the input means 4, sets the assembly unit for assembly (sub-assembly) with respect to the assembly model data displayed on the screen, the assembly unit setting/installation posture calculation unit 202 stores a group of components to be moved as the inputted sub-assembly or a group of components to be assembled in a simultaneous assembling operation in the assembly unit/installation posture data storage unit 303 as the assembly unit data. Also in step S23, the assembly unit setting/installation posture calculation unit 202 reads the component center of gravity data and the inertia tensor data from the component center of gravity/inertia tensor data storage unit 300 on the assembly unit basis, and calculates the posture of the installed components based on the data. The assembly unit setting/installation posture calculation unit 202 displays the calculated posture information about the installed components on the screen of the output means 5, and stores the posture information, after being finalized by confirmation or correction by the operator, in the assembly unit/installation posture data storage unit 303.

In step S24, the assembly sequence generation unit 203 reads the component arrangement/adjacency relationship data and the assembly unit/installation posture data from the component arrangement/adjacency relationship data storage unit 302 and the assembly unit/installation posture data storage unit 303, respectively, generates assembly sequence data by using the data, and stores the assembly sequence data in the assembly sequence data storage unit 304.

In step S25, the operator's vision-attached assembly animation generation unit 204 reads the corresponding assembly sequence data from the assembly sequence data storage unit 304, generates viewpoint-attached assembly animation data by using the assembly sequence data, and stores the viewpoint-attached assembly animation data in the assembly animation data storage unit 305.

In step S26, the work instruction diagram generation unit 205 reads the created operator's vision-attached assembly animation data from the assembly animation data storage unit 305 and creates a work instruction diagram.

In the following, the details of each of the steps S22 to S26 of FIG. 2 will be described.

<Step S22: Details of the Process of Acquiring Component Arrangement/Adjacency Relationship>

In step S22, first, the component arrangement/adjacency relationship acquisition unit 201 acquires, as arrangement information about the assembled item (completed item) designated by the operator and the constituent components of the assembled item, the coordinates of the eight vertices of a binding box that includes the assembled item or the constituent components in a CAD world coordinate.

Next, the acquisition of the inter-component adjacency relationship as another function of step S22 will be described.

Figure 3:
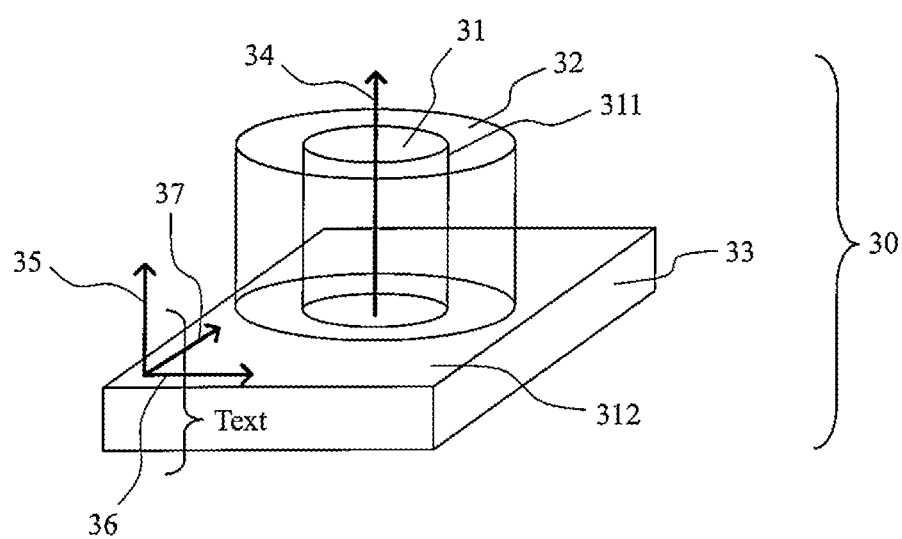
FIG. 3 illustrates a component adjacency relationship (example) according to the embodiment of the present invention.

An assembled item 30 illustrated in FIG. 3 will be considered, for example. The assembled item 30 includes a component 31 disposed in proximity to peripheral components 32 and 33. The component 31 and the component 32 are proximate to each other via a coaxial cylindrical face 311. The component 31 and the component 33 are proximate to each other via a planer face 312.

Thus, the component arrangement/adjacency relationship acquisition unit 201 acquires the type and geometric information of the proximate surface as follows.

(i) Cylindrical face: When the proximate surface is a cylindrical face, a directional vector 34 of the axis of the cylinder, the coordinate values of the center of the circle of the bottom of the cylinder, and the radius of the circle provide the information representing the adjacency relationship.

(ii) Planer face: When the proximate surface is a plane, a solid outward normal vector 35, two orthogonal axes 36 and 37 on the plane, and the coordinates of the origin provide the information representing the adjacency relationship.

(iii) Conical face: When the proximate surface is a conical face, the directional vector of the axis of the cone, the coordinate values of the center of the circle of the bottom surface of the cone, and the radius of the circle provide the information representing the adjacency relationship.

The determination as to whether surfaces of two components are proximate to each other may be based on whether the distance between certain surfaces is not more than a threshold value designated by the user. When the distance is not more than the threshold value, it may be determined that the two surfaces of the components are proximate to each other.

<Step S23: Details of Process of Setting Assembly Unit and Calculating the Details of Installation Posture>

Figure 4:
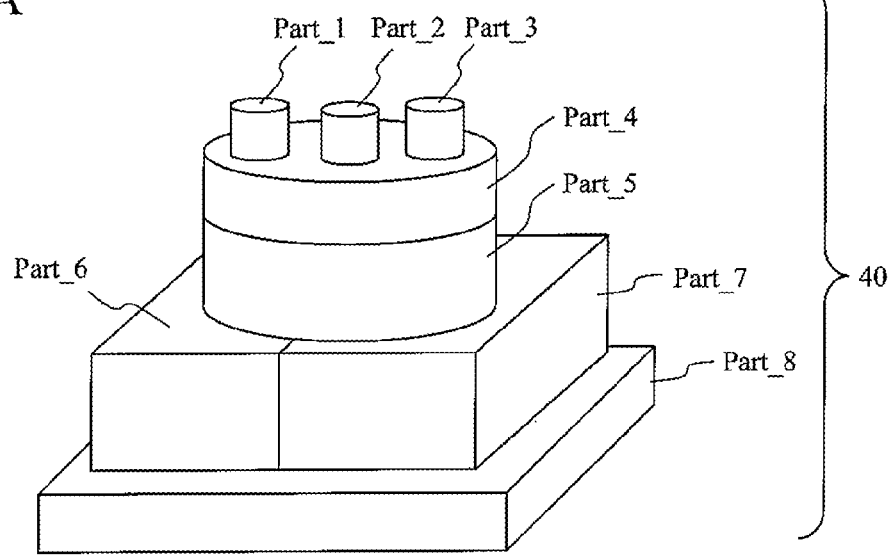
FIG. 4 illustrates an example of the setting of an assembly unit according to the embodiment of the present invention.
Figure 4:
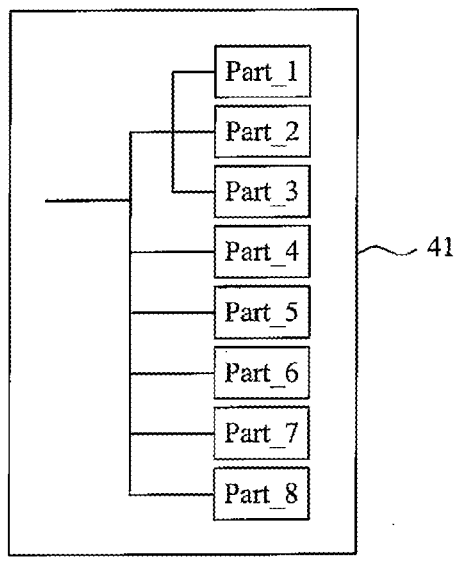
Figure 4:
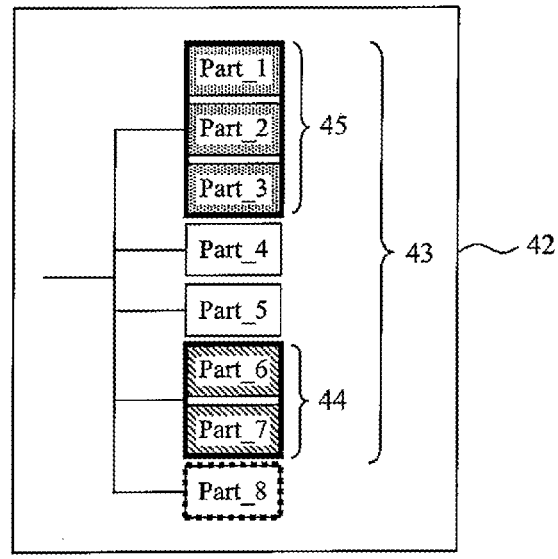

FIG. 4 illustrates the setting of the assembly unit in step S23 performed by the assembly unit setting/installation posture calculation unit 202.

The assembly model loaded in step S20 is based on a component unit 41 configured by the designer, as illustrated in FIG. 4B. Thus, the component unit 41 of the assembly model often differs from the assembly unit for assembling a single unit 40 illustrated in FIG. 4A, for example. Namely, the component unit 41 and the unit 40 in many cases do not correspond to each other on a one-to-one basis.

Thus, in step S23, the setting of the component unit 42 for the assembly sequence is divided into the setting of a component 43 as an object of assembly sequence generation (object of animation generation), the setting of a group of components 44 assembled as a sub-assembly item, and the setting of components 45 that do not form a sub-assembly item but for which a simultaneous assembly operation is performed (simultaneously assembled components: components that, while not forming a sub-assembly item, are attached to a certain component in the same direction simultaneously, for example). Because the component Part 8 is a base, Part 8 may be eliminated from the object for the setting of the component unit.

In the example of FIG. 4, while the component unit 41 according to design consists of eight components, as illustrated in FIG. 4B, the component unit 42 for the assembly sequence is set for four components (component units 44 and 45, and Parts 4 and 5, where the Part component 8 is excluded), as illustrated in FIG. 4C. In the following description, the components for assembly sequence generation refer to the component units that are set in step S23 and configured as illustrated in FIG. 4C.

Figure 10:
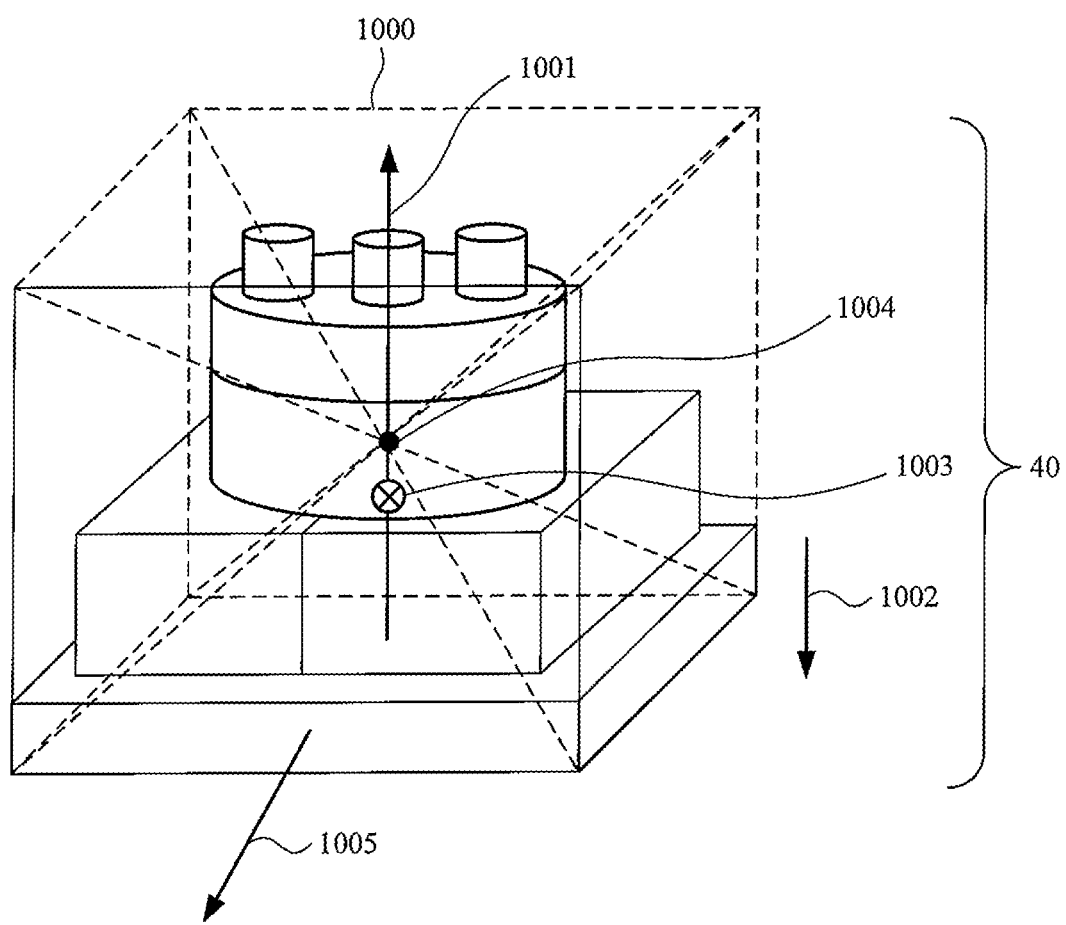
FIG. 10 illustrates an example of information regarding the calculation of installation posture of an assembly unit according to the embodiment of the present invention.

In step S23, when the assembly unit 40 is set, the installation posture for the assembly unit is calculated. The installation posture will be described with reference to FIG. 10. In the example of FIG. 10, the assembly unit 40 has a stable installation posture with respect to gravity when the installation posture of the assembly unit 40 is such that an inertia main axis (a primary inertia axis) 1001 having the maximum inertia moment in the assembly unit 40 is parallel with gravity 1002.

The center of gravity 1003 of the assembly unit 40 is obtained by accumulating information about the center of gravity of each of the components of the assembly unit. Then, the assembly unit 40 is installed in a direction such that the center of gravity 1003 is lower than a point of intersection 1004 of the diagonals of a smallest externally enclosing cuboid 1000, i.e., the binding box including the assembly unit, along the direction of gravity. In this way, a stable posture with respect to disturbance in the horizontal direction can be obtained. For example, when the center of gravity 1003 is above the point of intersection 1004, increased stability is obtained by reversing the installation posture. The inertia main axis 1001 is determined by using a common origin among the components of the assembled item according to a predetermined matrix operation using the inertia tensor information of each component. At this state, however, it cannot be finalized whether the axis direction is upward or downward. Thus, as described above, the direction of the inertia main axis 1001 is determined based on the positional relationship between the point of intersection 1004 and the center of gravity 1003. In the example of FIG. 10, the center of gravity 1003 is below the center 1004 when the gravity direction is 1002, so that the inertia main axis 1001 is determined to be upward. On the other hand, when the center of gravity 1003 is above the center 1004, the inertia main axis 1001 is determined to be downward, whereby a more stable posture (posture in the up-down direction) is set.

By using the above method, the vertical axis direction of the installation posture of the assembly unit 40 is calculated to be the inertia main axis 1001, for example, which is then displayed as a three-dimensional vector Z on the output means 5 by the assembly unit setting/installation posture calculation unit 202.

Next, the operator sets a front side direction orthogonal to the inertia main axis 1001 by using the input means 4. For example, it is supposed that for the assembly unit 40, the front side direction has been set for an arrow 1005, corresponding to a three-dimensional vector X. In S23, the remaining orthogonal vector Y is calculated by cross product operation Z×X of Z and X, and the three-dimensional orthogonal vectors (X, Y, Z) are obtained as the installation posture for the assembly unit 40.

<Step S24: Details of Assembly Sequence Generation Process>

Figure 5:
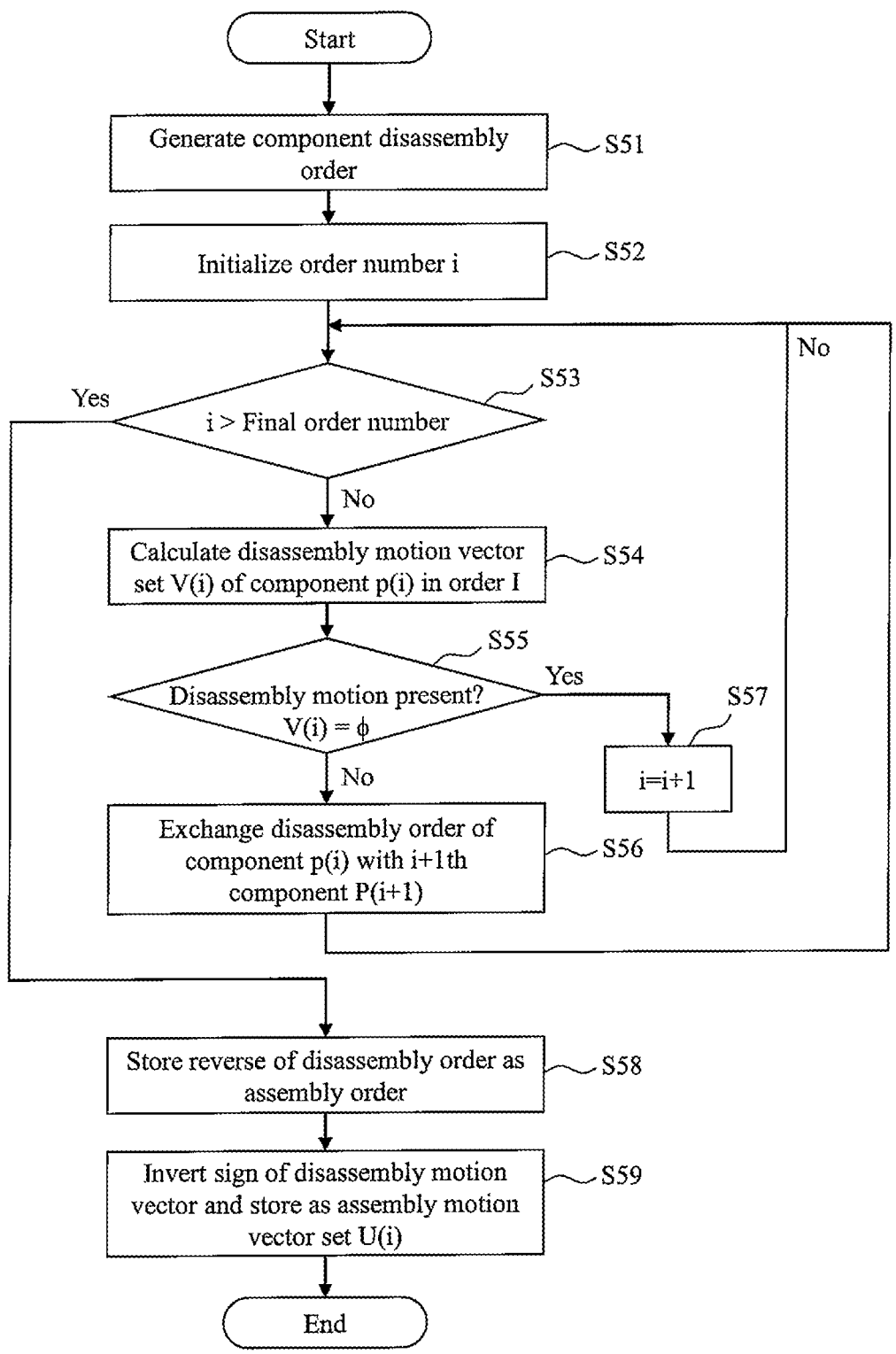
FIG. 5 is a flowchart illustrating the details of an assembly motion vector generation process according to the embodiment of the present invention.

The assembly sequence can be generated by generating a disassembly sequence from the CAD assembly model, reversing the disassembly order of the disassembly sequence, and inverting the sign of a disassembly motion vector. This processing procedure will be described with reference to FIG. 5. FIG. 5 is a flowchart illustrating the process of generating a disassembly sequence and generating an assembly sequence from the disassembly sequence.

In step S51, the assembly sequence generation unit 203, by referring to the component arrangement/adjacency relationship data in the component arrangement/adjacency relationship data storage unit 302, configures six constituent planer faces of the binding box from the eight vertices of the binding box including each object component, and generates the following component disassembly order plans ((i), (ii), or a combination thereof).

(i) The constituent components are arranged in order of decreasing height of any of the six constituent planer faces of the binding box in the vertical direction.

(ii) When generating an assembly sequence for a coaxially configured assembled item, with respect to component groups of which the four constituent surfaces of the binding box are parallel with the direction axis designated by the user, the component groups such that an inclusive relationship is satisfied between components with respect to the four constituent surfaces are arranged in order from the inside or the outside.

In the process (ii), with regard to two components that do not have a mutual internally or externally inclusive relationship, no order can be determined. In this case, all of the components can be ordered by using the process (i) for giving an order to the components. While all of the components can be ordered by using the process (i) independently, it is also possible to add a condition to components having the same rank that, for example, the component of which any of the six constituent planer faces of the binding box is on the left side has a higher rank.

In step S52, the assembly sequence generation unit 203 initializes the order number i of the disassembly order generated in step S51.

In step S53, the assembly sequence generation unit 203 determines whether the order number i has reached the final order number of the disassembly order. When it is determined that the order number i is not reached ("No" in S53), the process transitions to step S54. On the other hand, when it is determined that the order number i is reached ("Yes" in S53), the process transitions to step S58.

In step S54, the assembly sequence generation unit 203 calculates a disassembly motion vector set v(i) for an object component p(i) of the disassembly order i by a method as will be described below (see FIG. 6).

In step S55, the assembly sequence generation unit 203 determines whether a disassembly motion vector is generated. For example, a component at the center of the assembled item cannot be detached (moved) from the assembled item. In this case, it can be determined that "there is no disassembly motion vector". Whether the component may be moved can be judged from the adjacency relationship information of the component. When the disassembly motion is not generated due to interference with a proximate component ("No" in S55), the process transitions to step S56. When the disassembly motion is generated ("Yes" in S55), the process transitions to step S57.

In step S56, the assembly sequence generation unit 203 advances the order of the object component p(i) to i+1, and transitions the process to step S53. Namely, because of the absence of the disassembly motion vector, the order of detaching the component is moved back.

In step S57, the assembly sequence generation unit 203 advances the process object to the next order, i.e., i+1, and transitions the process to step S53.

In step S58, the assembly sequence generation unit 203 reverses the disassembly order and stores it as an assembly sequence.

In step S59, the assembly sequence generation unit 203 produces an assembly motion vector set u(i) by inverting the vector sign of the disassembly motion v(i) with respect to all of the order number i of the assembly sequence, and stores the assembly motion vector set u(i) in the assembly sequence data storage unit 304. The opposite of the disassembly motion vector is the assembly motion vector.

<Step S54: Details of Disassembly Motion Calculation Process>

Figure 6:
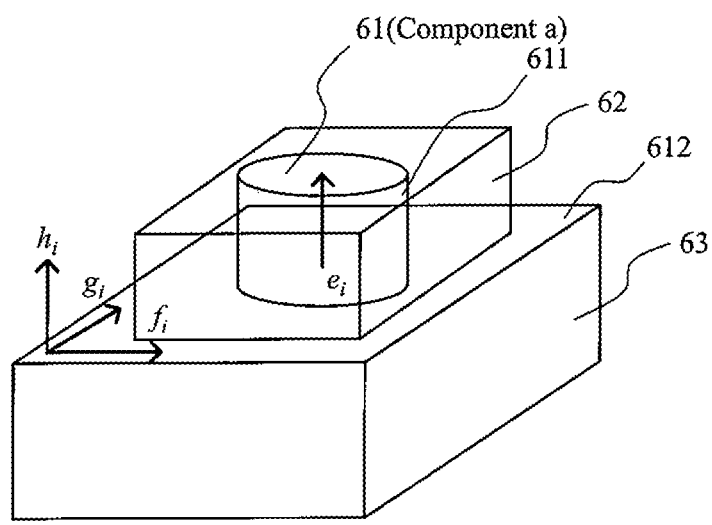
FIG. 6 illustrates a disassembly motion (example) according to the embodiment of the present invention.

FIG. 6 illustrates a configuration model illustrating the details of the disassembly motion calculation process in step S54.

First, the object component p(i) for disassembly motion calculation is designated "a". In the example of FIG. 6, the component a is designated by 61, and a component 62 is proximate to the component a via a cylindrical face 611, and a component 63 is proximate to the component a via a planer face 612. With respect to a surface j proximate to the component a, when the type of the surface j is cylindrical face or conical face, the disassembly motion vector set can be calculated by using a center axis $e_i$ of the cylindrical face according to Expression 1. Namely, in the case of cylindrical face, the disassembly motion vectors are vectors in the up-down direction.

$$^cM_a = \{e_i, -e_i\} \quad \text{(Expression 1)}$$

For example, when the type of the surface j is planer face, the motion vector set can be calculated from the solid outward normal to the planer face of the component 63 and the orthogonal vector on the planer face according to Expression 2. Namely, in the case of planer face, the disassembly motion vectors are vectors in the upper direction and the XY-directions.

$$^pM_a = \{h_i, f_i, -f_i, g_i, -g_i\} \quad \text{(Expression 2)}$$

When the component a has a plurality of proximate surfaces, the disassembly motion vector set for the component a can be expressed as a sum set of the motion vector set for each surface according to Expression 3.

$$^cM_a = \{e_i, -e_i\} \quad \text{(Expression 3)}$$

The operation range of motion of the object component a is limited by a proximate planer face, so that the component a may interfere with the proximate planer face j.

A motion domain set for the proximate planer face j is calculated according to Expression 4, for example. This is because in FIG. 6, for example, the component a (component 61) can only be moved in the upper direction.

$$D_a = \{h_i\} \quad \text{(Expression 4)}$$

With respect to a motion vector $m_i$ belonging to the motion vector set $M_a$, a revised motion vector to which a limitation by the element vector $d_j$ of the operation range set $D_a$ is added is calculated by Expression 5.

$$\begin{cases} F(m_i, -d_j) = \begin{cases} [\overline{m}_i^{j-1} \cdot (-d_j)]d_j & (m_i \cdot (-d_j) > 0) \\ 0 & (m_i \cdot (-d_j) \le 0) \end{cases} \\ m = \overline{m}_i^{j-1} + F(m_i, -d_j) \\ \overline{m}_i^j = \dfrac{m}{\sqrt{m \cdot m}} \end{cases} \quad \text{(Expression 5)}$$

If the revised motion vector to which the limitation of motion domain of the proximate planer face j is provided interferes with a proximate planer face k (k≠j) other than the proximate planer face j, the revised motion vector does not become a disassembly motion vector for the component a. Thus, the revised motion vector is corrected again by the process of Expression 6 to calculate a re-revised motion vector.

$$\begin{cases} G_k(\overline{m}_i^n) = \begin{cases} 1 & (\overline{m}_i^n \cdot (-d_k) \le 0) \\ 0 & (\overline{m}_i^n \cdot (-d_k) > 0) \end{cases} \\ \alpha_i = \prod_{k=1}^{n} G_k(\overline{m}_i^n) = \begin{cases} 1 \\ 0 \end{cases} \\ \hat{m}_i = \alpha_i \cdot \overline{m}_i^n \end{cases} \quad (\text{式 6})$$

When a disassembly motion vector set V(i) for the component a is produced by using a re-revised motion vector other than a zero vector as an element, V(i) is expressed by Expression 7. In Expression 7, interference components are eliminated, and V(i) is a set of candidates of directions (disassembly motion vectors) for removal.

$$V(i) = \{\hat{m}_1 \ldots \hat{m}_{q'} | \hat{m}_k \ne 0 \ (k=1, \ldots q')\} \quad \text{(Expression 7)}$$

By the above process, a plurality of disassembly motion vectors that do not interfere with the proximate surface with respect to the component a is generated, and an assembly motion vector set U(i) of vectors expressed by Expression 8 is produced by inverting the sign of the disassembly motion vectors, and stored in the assembly sequence data storage unit 304 as assembly sequence data together with the assembly order.

$$U(i) = \{-\hat{m}_k | \hat{m}_k \in V(i)\} \quad \text{(Expression 8)}$$

<Step S25: Details of Camera Eye Sight-Attached Assembly Animation Generation Process>

By the process up to step S24, the motion of components (assembly motion vectors) is determined. In step S25, camera disposed positions are set.

Step S25 is a process in which assembly animation data is generated from the assembly sequence data 13 created in step S24 and stored in the assembly animation data storage unit 305.

Figure 7:
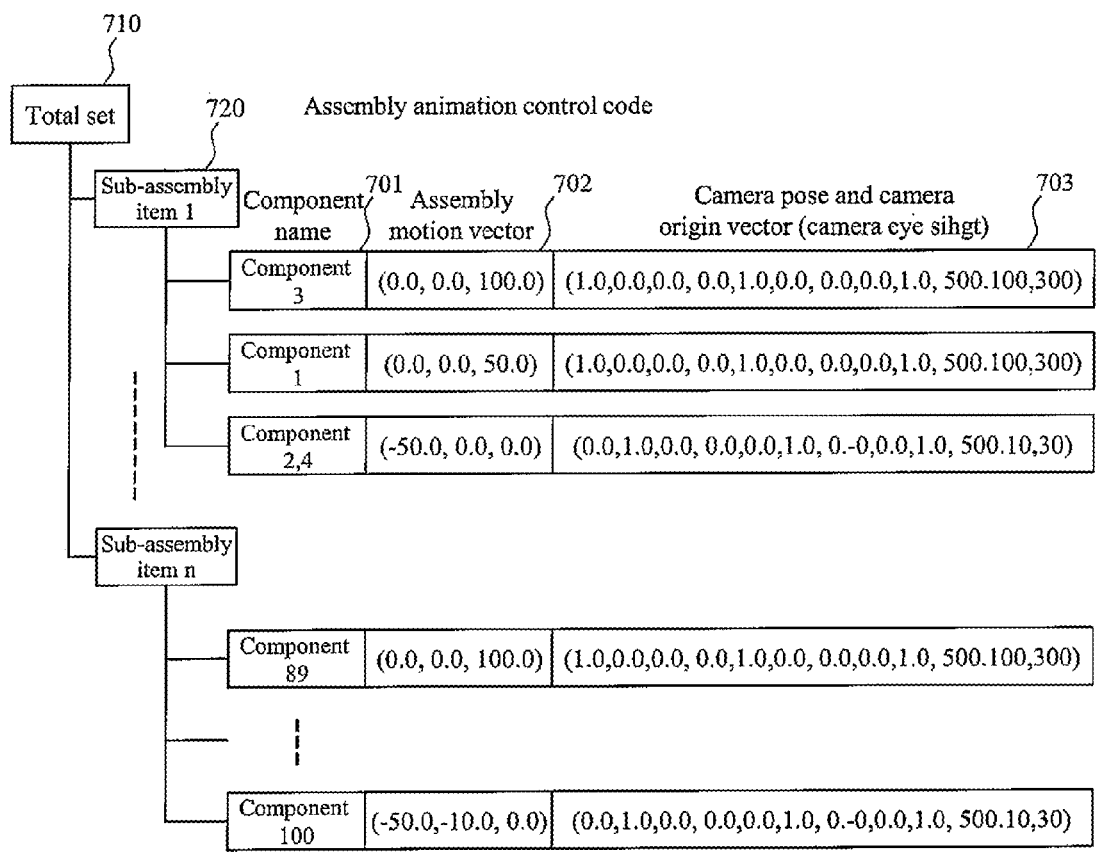
FIG. 7 illustrates a data list showing an assembly animation data configuration according to the embodiment of the present invention.

The assembly animation data includes, for example, as illustrated in FIG. 7, a component name 701 of an object moved, an assembly motion vector 702 indicating the direction of movement, and a camera eye sight 703. These data are associated with each sub-assembly item 720 in a total set 710 unit basis, and stored in the assembly animation data storage unit 305 as assembly animation data.

Next, a method for calculating a camera pose for setting a camera eye sight will be described. A plurality of cameras are placed evenly around the Z-axis, i.e., the vertically upward direction, using the XY planer face of the assembly unit installation posture calculated in S23 as the horizontal planer face. Then, the cameras are automatically switched for suitably capturing the assembly operation by a method described below.

A method for calculating the pose of the plurality of cameras will be described. The number of cameras set via the input means 4 by the operator is N. The posture coordinate system for the assembly unit installation is [X, Y, Z]. The Z-axis is upward without fail. The installation posture coordinate system is the coordinate system determined in step S23 in which the assembly unit is in a stable posture.

Figure 11:
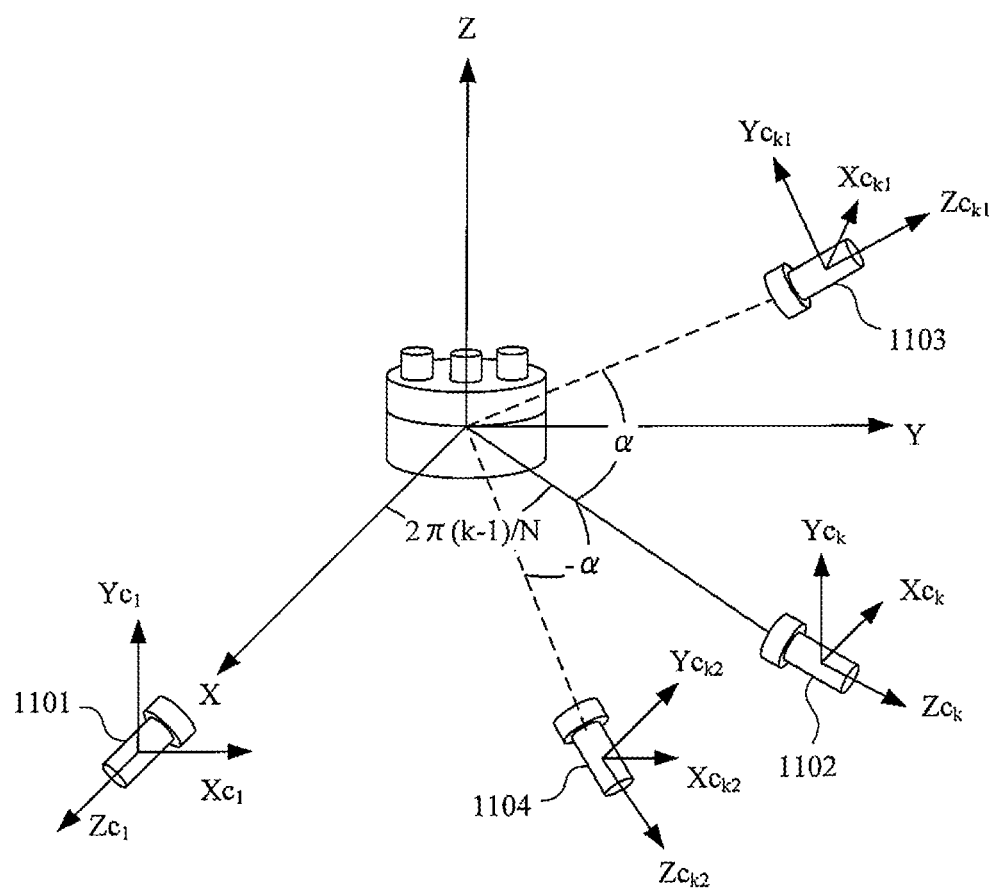
FIG. 11 illustrates an example of the setting of a plurality of cameras according to the embodiment of the present invention.

As illustrated in FIG. 11, the posture [$Xc_1$, $Yc_1$, $Zc_1$] of a first camera 1101 is calculated according to Expression 9. According to Expression 9, a camera Zc1 axis is set in the front side direction X of the assembly unit, and a camera Yc(1) axis is set in the vertically upward direction Z of the assembly unit. According to Expression 9, the camera coordinates are included in the installation posture coordinate system.

$$\begin{cases} Z_{c1} = X \\ Y_{c1} = Z \\ X_{c1} = Y_{c1} \times Z_{c1} \end{cases} \quad \text{(Expression 9)}$$

A posture [$Xc_k$, $Yc_k$, $Zc_k$] of a k-th camera 1102 (k=1, ..., N) is calculated by Expression 10. The $Zc_k$-axis of the k-th camera corresponds to the front side directional vector X of the assembly unit rotated by $2\pi \cdot (k-1)/N$ about the vertically upward directional vector Z. Thus, the N cameras are disposed about the Z-axis at predetermined intervals.

$$\begin{cases} Z_{ck} = Rot(Z, 2\pi(k-1)/N)X \\ Y_{ck} = Z \\ X_{ck} = Y_{ck} \times Z_{ck} \end{cases} \quad \text{(Expression 10)}$$

When the posture [$Xc_k$, $Yc_k$, $Zc_k$] of the k-th camera (k=1, ..., N) is rotated upward about the front side vector X by an angle $\alpha$ (such as a preset positive constant), the camera is designated as a k1-th camera 1103 [$Xc_{k1}$, $Yc_{k1}$, $Zc_{k1}$]. When the posture is rotated downward by an angle $-\alpha$, the camera is designated as a k2-th camera 1104 [$Xc_{k2}$, $Yc_{k2}$, $Zc_{k2}$].

Next, a method for selecting a camera suitable for capturing the assembly motion will be described. It is supposed that the assembly motion vector of the component p(i) with an assembly sequence order number i is $u_i$ 1201. Then, a camera km that satisfies the condition of Expression 11 is selected.

$$1 \geq -u_i \Box Zc_{km} \geq \cos(\pi/N) \ (k=1, \ldots N, m=1, 2) \quad \text{(Expression 11)}$$

Figure 12:
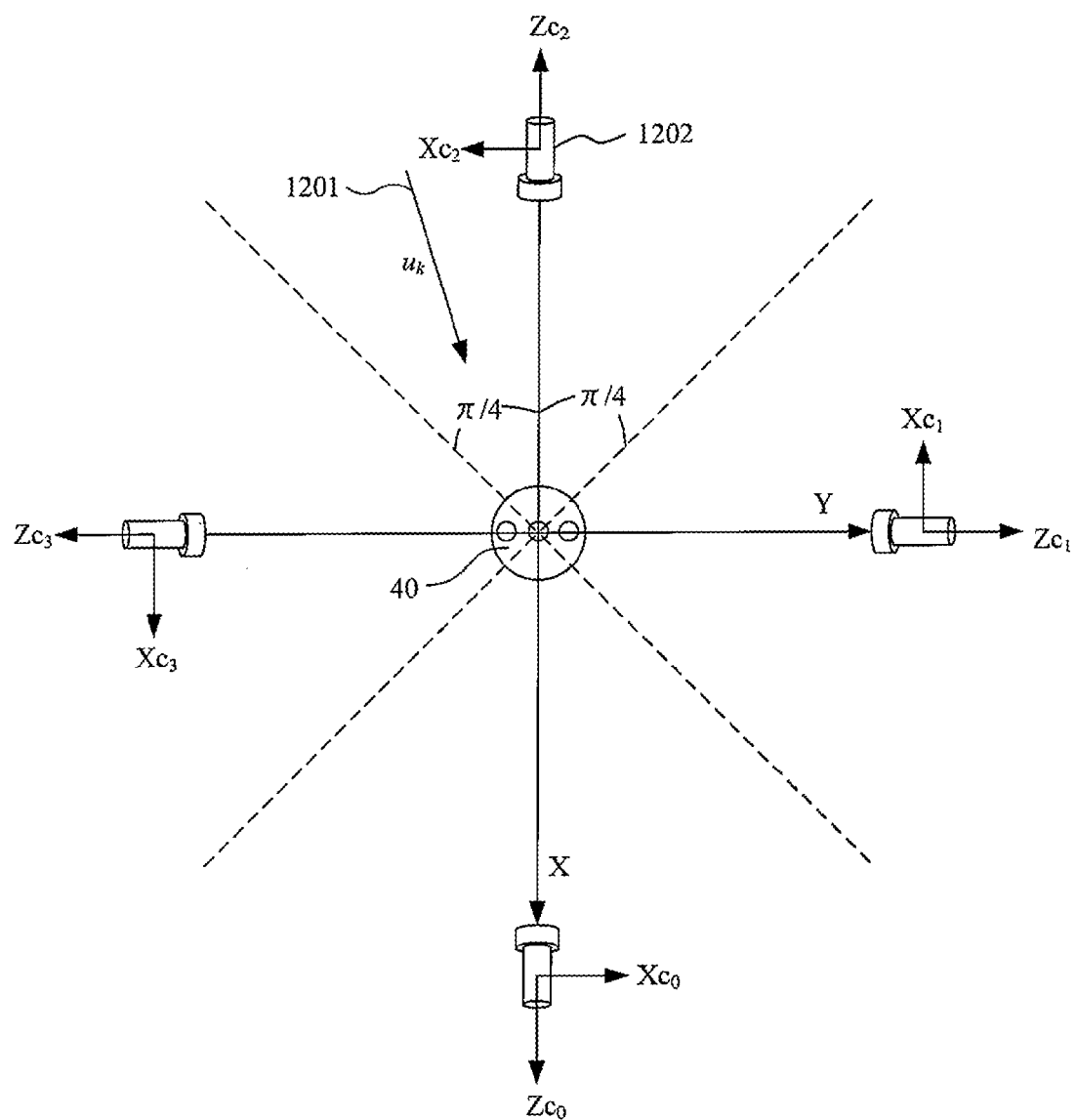
FIG. 12 illustrates an example of selection of a camera suitable for capturing an assembly motion according to the embodiment of the present invention.

According to Expression 11, a camera with the Zc-axis that is the most parallel with the assembly motion vector and with an opposite direction is selected. Namely, a camera axis that is close to being parallel with the assembly motion vector (assembled direction) is selected. Thus, a direction providing a good operator's vision is determined. In the example of FIG. 12, a second camera 1202 is selected with respect to the assembly motion vector $u_i$ 1201. Because the assembled direction varies between the components, the camera direction (camera axis) is selected for each component and used for animation generation.

With the assembly model of an assembled item being observed from the camera pose thus calculated, animation illustrating how the component p(i) is assembled to the assembly model of the assembled item while being moved by the assembly motion vector $u_i$ is created.

Next, a method for adjusting the camera pose will be described. A three-dimensional model of the assembled item as viewed from the calculated camera pose is displayed on the screen of the output means 4, by way of an animation image 802 in a three-dimensional model display area 801 of a screen 800 illustrated in FIG. 8, for example. The operator can operate the displayed animation image 802 (up/down, left/right, rotation, size increase and decrease) directly on the screen 800 to adjust the camera pose (including position).

The camera pose adjustment is performed for each of the assembled items in the order of assembly to the assembly model, so that all of the camera poses subsequent to the order number involving the change are modified.

For example, in the assembly orders up to the a-th order (a is an arbitrary natural number), if the camera pose is changed to A at the order number n (n≤a), the camera pose A is reflected to the assembly orders of n or more and a or less. When the camera pose is changed to B in advance at the assembly order number m (n<m≤a), the camera pose A is reflected to the assembly order numbers of n or more and (m−1) or less. Conversely, when the camera pose is changed to B at the m-th assembly order from the last, the camera pose B is reflected to the assembly order numbers of m or more and a or less. Thus, the pose can be changed according to the operator's preference even when the pose has been automatically generated.

By viewing the animation showing, in the set camera pose, how the three-dimensional model is assembled in accordance with the assembly order numbers, the assembly order numbers and the camera pose that have been set can be confirmed.

The assembly animation can also be played back from an arbitrary order number, or ended at an arbitrary order number. The playback speed of the animation can be changed, or frame forward or frame rewind can be performed in frame units such that a single block constitutes a single frame, whereby the worker can view the animation at desired speed for confirmation.

Figure 8:
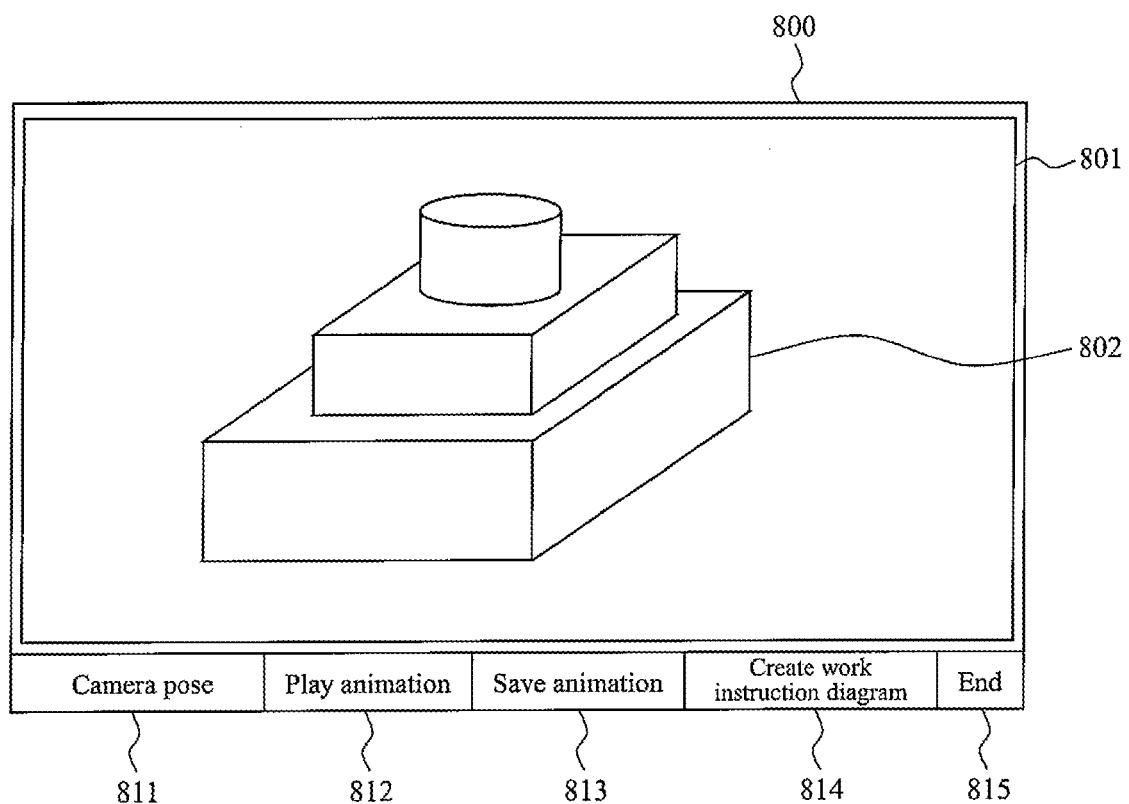
FIG. 8 illustrates a screen example (screen front view) displaying assembly animation according to the embodiment of the present invention.

In order to view the animation, the operator presses a "Play animation" button 812 in FIG. 8. When the play animation button 812 is pressed, the three-dimensional model 802 displayed in the three-dimensional model display area 801 starts moving, and the operator can view the animation showing how the relevant assembled item is assembled. By setting the start position of the animation in advance, the assembly animation can be viewed from a designated assembly order number. When the playback of the animation is to be ended in the middle, the animation can be stopped by pressing the button 812, which is changed into a "Sop animation" button during playback. When the created animation is to be saved at the end of confirmation of the assembly order and camera pose, a "Save animation" button 813 is pressed to save the edited animation, and the animation edit work is ended by pressing an "End" button 815.

<Step S26: Details of Work Instruction Diagram Creation Process>

Next, a process of creating a work instruction diagram (which may also be referred to as "work instructions") based on the created and edited animation will be described.

Figure 9:
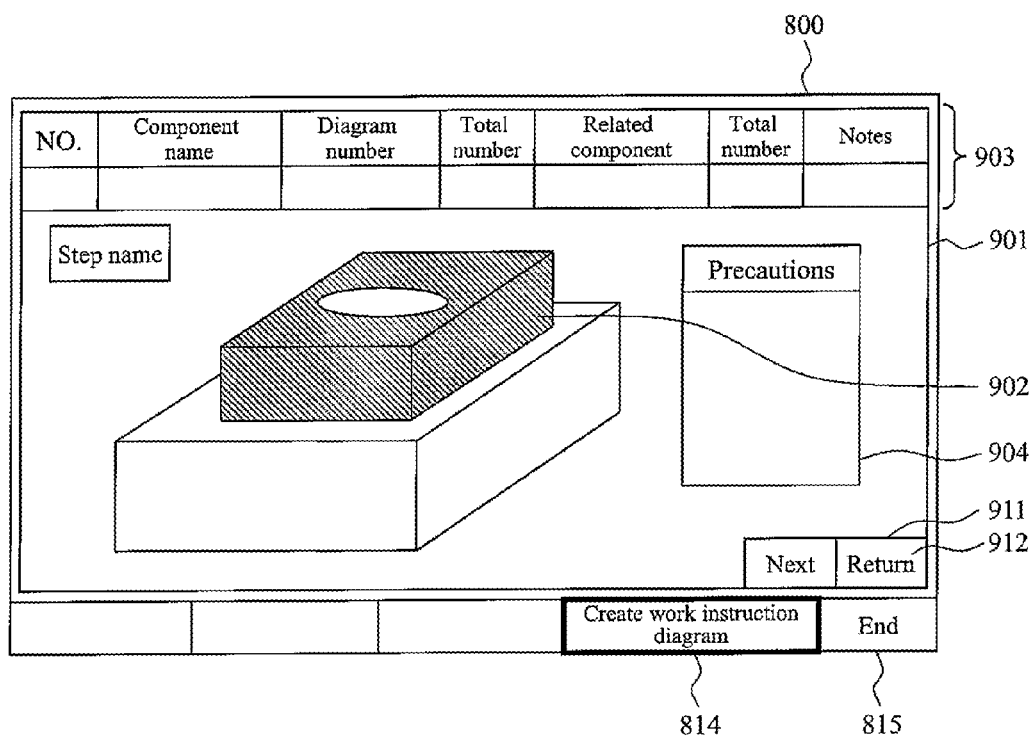
FIG. 9 illustrates a screen example (screen front view) displaying a work support diagram according to the embodiment of the present invention.

In the screen of FIG. 8, when the operator presses a "Create work instruction diagram" button 814, the screen is changed to a work instructions screen illustrated in FIG. 9.

FIG. 9 illustrates a case where work instructions for a component 902 as a highlight component is displayed in a work instruction diagram display area 901. In a column 903, quality confirmation information about the highlight component 902, such as a component name, a diagram number, and a total number, is displayed. In a column 904, precautions to be observed when assembling the highlight component 902 are displayed.

When a "Next" button 911 in the lower right corner of the screen is clicked, information about a component to be assembled after the currently displayed highlight component 902 is displayed in the work instruction diagram display area 901. When a "Return" button 912 is clicked, information about a component to be assembled prior to the currently displayed highlight component 902 is displayed in the work instruction diagram display area 901.

After the work instructions for each component are confirmed, an "End" button 815 is clicked to end the work.

<Conclusion>

According to the embodiment of the present invention, the primary inertia axis of the assembled item is calculated from the inertia tensor information of each component. Based on the adjacency relationship information indicating the adjacency relationship between a plurality of components, the assembly sequence and the assembly motion vectors indicating the assembled direction of the plurality of components are generated. The assembly sequence and the assembly motion vectors are calculated such that each of the plurality of components does not interfere with a proximate component. Then, a plurality of camera eye sights each having a camera axis is disposed around the primary inertia axis. The camera eye sights provide candidates for the operator's vision at the time of assembly animation generation. Further, with respect to each of the plurality of components, the camera eye sight with a direction that most closely matches the assembly motion vector of the object component is selected. The selected camera eye sight provides the operator's vision for the object component. From the operator's vision, an assembly animation for the assembled item is generated. In this way, an operator's vision in accordance with the actual work can be automatically generated. According to the conventional system in which the camera axis is made parallel with the assembly operation vector of the component, the work installed planer face is not considered, resulting in the generation of a field of view based on a worker posture that is not feasible. According to the present invention, this problem is eliminated. The operator's vision may be generated in an assembly unit basis designated by the user (such as an sub-assembly unit basis). Thus, the animation generation efficiency can be increased.

Further, according to the present invention, the work instruction diagram including still images before and after assembly of a designated component is generated based on an assembly animation image. In this way, the user who does not need to see all of the assembly operation can be provided with assembly information of only a necessary portion, so that the work efficiency for the user can be increased.

According to the present invention, a plurality of camera eye sights may be arranged at a predetermined angle with respect to a planer face to which the first main axis is normal. At this time, a camera eye sight at a predetermined angle ($\alpha$, $-\alpha$) with the assembly motion vector of each component provides an operator's vision candidate for the object component. When the camera eye sight is viewed on the planer face to which the first main axis is normal, the selected camera eye sight is most closely aligned with the direction of the assembly motion vector. However, when viewed from the direction of the first main axis, the selected camera eye sight is at a predetermined angle. In this way, a work field slightly shifted (by the predetermined angle) from the view of the assembly operation from the directly front side of the component can be created, whereby the user can be provided with an operator's vision that is easier to view.

The assembly motion vector is generated by determining the disassembly order for a plurality of components, generating the disassembly motion vector for each of the plurality of components in the disassembly order, and inverting the sign of the disassembly motion vector. The assembly sequence is the reversal of the disassembly order. In this way, the assembly motion vector and the assembly sequence can be easily generated from the assembled item.

An adjustment interface for adjusting the camera pose at the selected camera eye sight may be displayed on the screen. Thus, a camera eye sight more suitable for the user's preference can be provided.

The present invention may be realized with a software program code for realizing the function of the embodiment. In this case, a system or an apparatus is provided with a storage medium in which the program code is recorded, and a computer (or a CPU or an MPU) of the system or apparatus reads the program stored in the code storage medium. In this case, the function of the embodiment is realized by the program code per se read from the storage medium, and the program code per se and the storage medium storing the program code constitute the present invention. Examples of the storage medium for supplying the program code include a flexible disc, a CD-ROM, a DVD-ROM, a hard disk, an optical disk, a magneto-optical disk, a CD-R, a magnetic tape, a non-volatile memory card, and a ROM.

An operating system (OS) and the like running on a computer may perform a part or all of an actual process based on an instruction of the program code so that the function of the embodiment is realized by the process. Further, after the program code read from the storage medium is written to a memory on the computer, the CPU of the computer and the like may perform a part or all of an actual process based on an instruction of the program code so that the function of the embodiment is realized by the process.

Further, the software program code for realizing the function of the embodiment via a network may be delivered via a network and stored in a storage means of the system or apparatus, such as a hard disk or a memory, or in a storage medium such as a CD-RW or a CD-R, by the software program code. Then, the program code stored in the storage means or the storage medium may be read and performed by the computer (or a CPU or an MPU) of the system or the apparatus during use.

Finally, it should be understood that the processes and technology described herein are essentially not related to any specific apparatus and may be implemented by any appropriate combination of components. Furthermore, general-purpose devices of various types may be used in accordance with the teachings described herein. It may turn out that constructing a dedicated apparatus may be beneficial for carrying out the method steps described herein. Various inventions may be obtained by appropriate combinations of the plurality of constituent elements according to the disclosure of the embodiment. For example, some of the constituent elements of embodiment may be deleted, or constituent elements from different embodiments may be combined as needed. While the present invention has been described with reference to specific examples, these are for illustrative purposes in every respect and not to be taken in a limiting sense. It will be seen by those skilled in the relevant art that various suitable combinations of hardware, software, and firmware exist for implementing the present invention. For example, the software described above may be implemented by a wide range of programs or script languages, such as assembler, C/C++, perl, Shell, PHP, and Java (registered trademark).

Further, the control lines and information lines in the foregoing embodiment are only those considered necessary for description, and do not necessarily indicate all of the control line and information lines of a product. All of the elements may be mutually connected.

In addition, other implementations of the present invention will become apparent to those skilled in the relevant art based on a reading of the specification and a study of the embodiment disclosed herein. Various modes and/or components of the embodiment described herein may be used individually or in any combination in a computerized storage system with a data managing function. The specification and the examples therein are merely typical, and the spirit and scope of the present invention will be indicated by the appended claims.

REFERENCE SIGNS LIST

1 Computer system
2 Processing means (processor)
3 Storage means
4 Input means
5 Output means
6 Connection line
7 CAD
200 Component center of gravity/inertia tensor acquisition unit (component center of gravity/inertia tensor acquisition program)
201 Component arrangement/adjacency relationship acquisition unit (component arrangement/adjacency relationship acquisition program)
202 Assembly unit setting/installation posture calculation unit (assembly unit setting/installation posture calculation program)
203 Assembly sequence generation unit (assembly sequence generation program)
204 Operator's vision-attached assembly animation generation unit (operator's vision-attached assembly animation generation program)
205 Work instruction diagram generation unit (work instruction diagram generation program)
301 Assembly model data storage unit
300 Component center of gravity/inertia tensor data storage unit
302 Component arrangement/adjacency relationship data storage unit
303 Assembly unit/installation posture data storage unit
304 Assembly sequence data storage unit
305 Assembly animation data storage unit
306 Work instruction diagram data storage unit

The invention claimed is:

1. A computer system for generating an assembly animation, the computer system comprising:
a processor for generating an assembly animation;
a memory for storing information about the generated assembly animation; and
a display for displaying the generated assembly animation in response to control by the processor,
wherein the processor is configured to:
acquire inertia tensor information and center of gravity information of each of a plurality of components of an assembled item,
calculate a center of gravity of the assembled item using the center of gravity information of each of the plurality of components, wherein the center of gravity of the assembled item includes a primary inertia axis of the assembled item determined using the inertia tensor information of each of the plurality of components;
acquire adjacency relationship information indicating an adjacency relationship between the plurality of components of the assembled item;
generate, based on the adjacency relationship information between the plurality of components, and the inertia tensor information and the center of gravity information of each of the plurality of components, an assembly sequence and an assembly motion vector, wherein the assembly motion vector indicates an assembled direction of the plurality of components such that each of the plurality of components does not interfere with a proximate component;
arrange a plurality of camera eye sights each having a camera axis about the primary inertia axis and providing a candidate for an operator's vision during the generation of the assembly animation;
select a camera eye sight having a direction most closely matching the assembly motion vector for each of the plurality of components;
set the selected camera eye sight as the operator's vision; and
generate the assembly animation from the operator's vision.

2. The computer system according to claim 1, wherein the processor, based on images of the assembly animation, generates a work instruction diagram including still images before and after assembly of a designated component.

3. The computer system according to claim 1, wherein the processor arranges the plurality of camera eye sights at a first predetermined angle with respect to a planer face to which a first main axis is normal, and selects the selected camera eye sight at a second predetermined angle with respect to the assembly motion vector for each component as the candidate for the operator's vision.

4. The computer system according to claim 1, wherein the processor determines a disassembly order for the plurality of components, generates a disassembly motion vector for each of the plurality of components in the disassembly order, and generates the assembly motion vector by inverting a sign of the disassembly motion vector.

5. The computer system according to claim 4, wherein the processor generates the assembly sequence by reversing the disassembly order into an assembly order.

6. The computer system according to claim 1, wherein the processor sets an assembly unit as a set of those of the plurality of components constituting the assembled item that are simultaneously assembled in response to an instruction input, determines an installation posture based on the primary inertia axis of the assembly unit, and sets the operator's vision with respect to each component of the assembly unit in the installation posture.

7. The computer system according to claim 1, wherein the processor controls the display to cause an adjustment interface for adjusting a camera pose at the selected camera eye sight to be displayed on a screen.

8. An assembly animation generation method comprising:
acquiring, by a processor of a computer system, inertia tensor information and center of gravity information of each of a plurality of components constituting an assembled item;
calculating a center of gravity of the assembled item using the center of gravity information of each of the plurality of components, wherein the center of gravity of the assembled item includes a primary inertia axis of the assembled item determined using the inertia tensor information of each of the plurality of components;

acquiring, by the processor, adjacency relationship information indicating an adjacency relationship between the plurality of components of the assembled item;

generating, by the processor, based on the adjacency relationship information of the plurality of components, and the inertia tensor information and the center of gravity information of each of the plurality of components, an assembly sequence and an assembly motion vector, wherein the assembly motion vector indicates an assembled direction of the plurality of components such that each of the plurality of components does not interfere with a proximate component;

arranging, by the processor, a plurality of camera eye sights each having a camera axis about the primary inertia axis and providing a candidate for an operator's vision during the generation of the assembly animation;

selecting, by the processor, a camera eye sight having a direction most closely matching the assembly motion vector for each of the plurality of components;

setting, by the processor, the selected camera eye sight as the operator's vision; and generating, by the processor, the assembly animation from the operator's vision and displaying the assembly animation on a screen of a display.

9. The assembly animation generation method according to claim 8, further comprising:

generating, by the processor, a work instruction diagram based on images of the assembly animation, the work instruction diagram includes still images before and after assembly of a designated component.

10. The assembly animation generation method according to claim 8, wherein, the setting the selected camera eye sight as the operator's vision includes:

arranging, by the processor, a plurality of camera eye sights at a predetermined angle with respect to a planer face to which a first main axis is normal, and selecting, by the processor, the selected camera eye sight at the predetermined angle with respect to the assembly motion vector of each component as the candidate for the operator's vision.

11. The assembly animation generation method according to claim 8, wherein, in the step of generating the assembly motion vector, the processor determines a disassembly order of the plurality of components, generates a disassembly motion vector for each of the plurality of components in the disassembly order, and generates the assembly motion vector by inverting a sign of the disassembly motion vector.

12. The assembly animation generation method according to claim 11, wherein the processor generates the assembly sequence by reversing the disassembly order into an assembly order.

13. The assembly animation generation method according to claim 8, further comprising:

setting, by the processor, in response to an instruction input, an assembly unit as a set of those of the plurality of components constituting the assembled item that are simultaneously assembled; and determining, by the processor, an installation posture based on the primary inertia axis of the assembly unit, wherein, the step of setting the selected camera eye sight as the operator's vision includes setting, by the processor, the operator's vision for each component of the assembly unit in the installation posture.

14. The assembly animation generation method according to claim 8, further comprising the step of the processor controlling the display to display an adjustment interface for adjusting a camera pose at the selected camera eye sight.

* * * * *